United States Patent [19]
Dolan et al.

[11] 3,838,774
[45] Oct. 1, 1974

[54] APPARATUS FOR MONITORING WATER PURIFICATION SYSTEM

[75] Inventors: John C. Dolan, 4393 Mt. Henry Ave., San Diego, Calif. 92117; Newton E. Ball, Solana Beach, Calif.

[73] Assignee: said Dolan, by said Ball

[22] Filed: Jan. 2, 1973

[21] Appl. No.: 320,446

[52] U.S. Cl................... 210/85, 210/96, 210/321
[51] Int. Cl............................................ B01d 31/00
[58] Field of Search................... 210/96, 321, 85

[56] References Cited
UNITED STATES PATENTS

| | | | |
|---|---|---|---|
| 3,355,382 | 11/1967 | Huntington | 210/321 X |
| 3,366,241 | 1/1968 | McMorris | 210/96 |
| 3,410,292 | 11/1968 | Bennett et al. | 210/96 X |
| 3,462,362 | 8/1969 | Kollsman | 210/321 X |
| 3,490,591 | 1/1970 | Jones et al. | 210/96 X |
| 3,618,766 | 11/1971 | Morey | 210/96 X |
| 3,693,797 | 9/1972 | Topol | 210/96 |
| 3,725,263 | 4/1973 | Harris et al. | 210/96 X |

*Primary Examiner*—Frank A. Spear, Jr.
*Attorney, Agent, or Firm*—Fraser and Bogucki

[57] ABSTRACT

An apparatus for precisely monitoring the effectiveness of a reverse osmosis water purification system is disclosed which continuously measures and compares the electrical conductivities of the impure aqueous solution and the purified water on the inlet and outlet sides, respectively, of the semipermeable membrane of the reverse osmosis system. A meter provides a visual indication of the comparison which is preferably related to the ratio of the outlet side conductivity to the inlet side conductivity and a fail-safe alarm signals when this ratio exceeds a selected level. The meter may be scaled so that during a normal operating mode of the apparatus it indicates the actual ratio of the impurity levels of the outlet and inlet sides and during a test mode it indicates a selectable alarm point.

23 Claims, 6 Drawing Figures

3,838,774
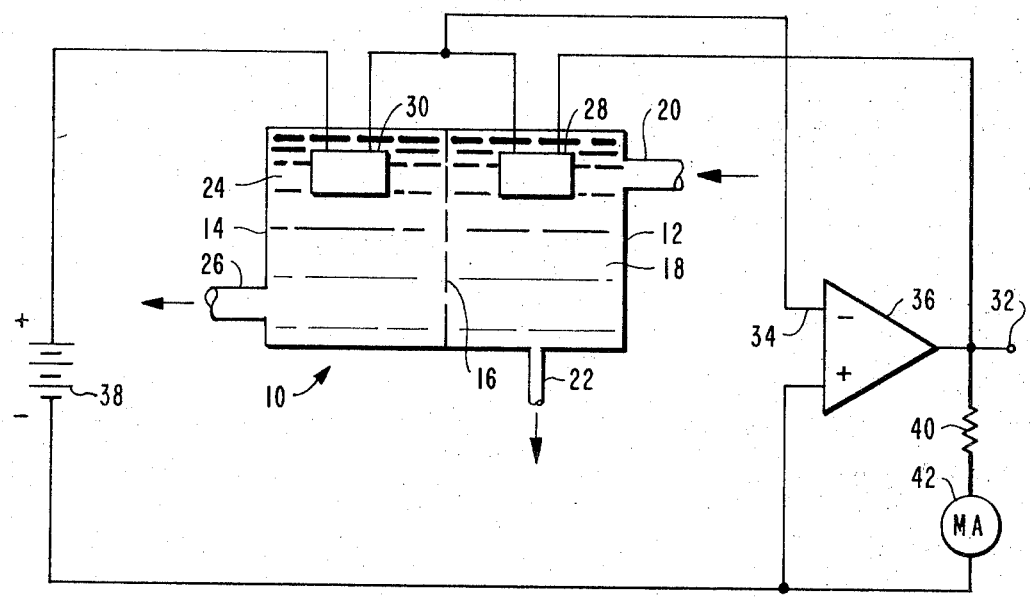
FIG.—1
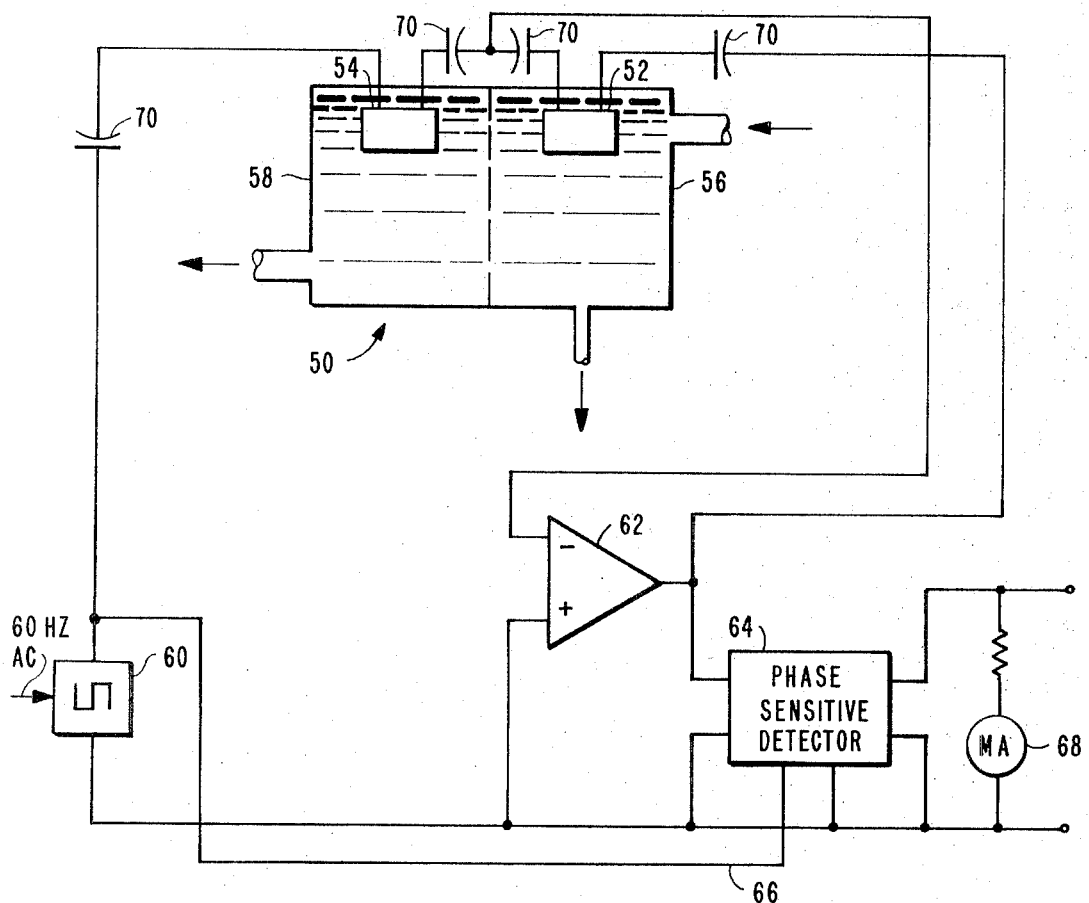
FIG.—2

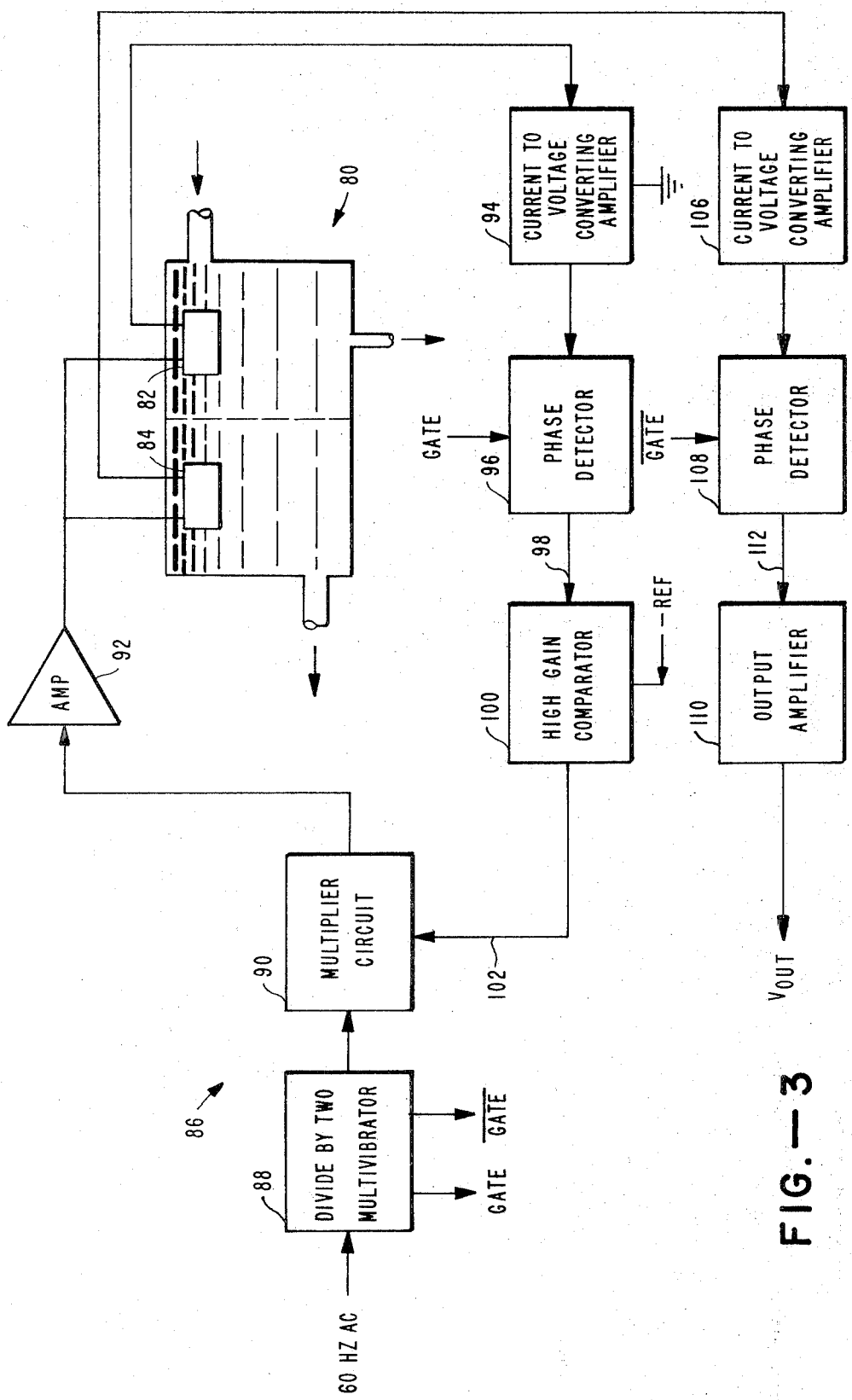
FIG.—3

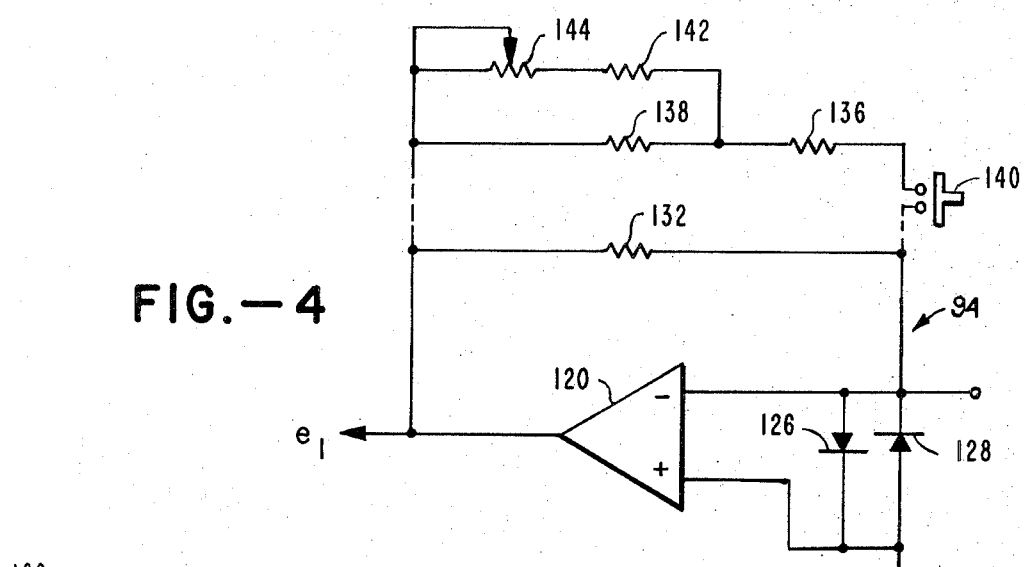
FIG.—4
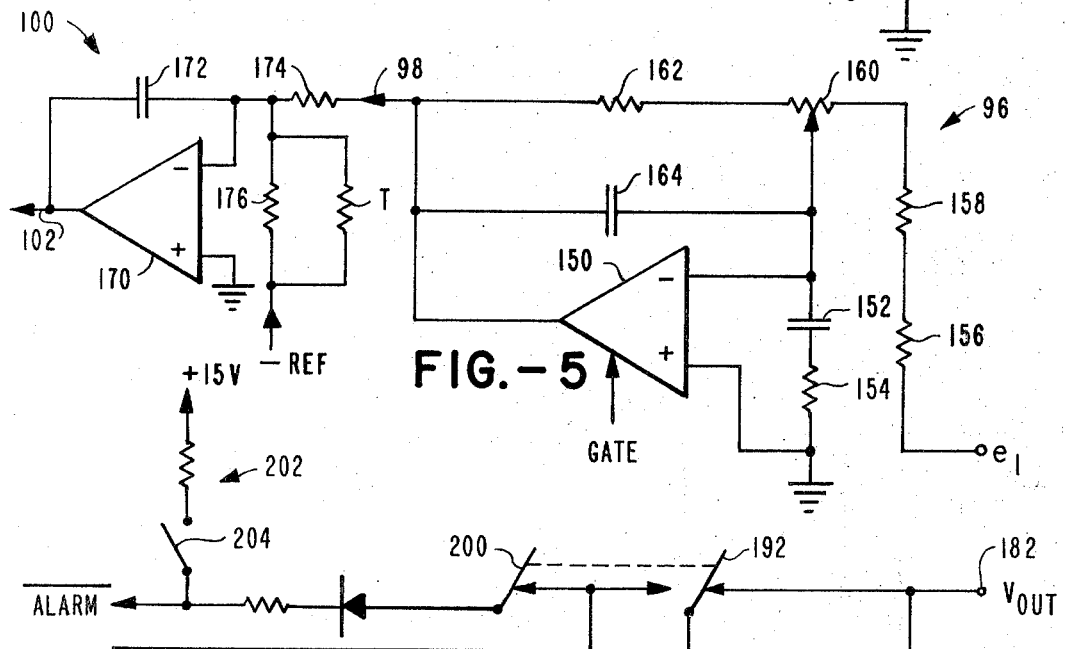
FIG.—5
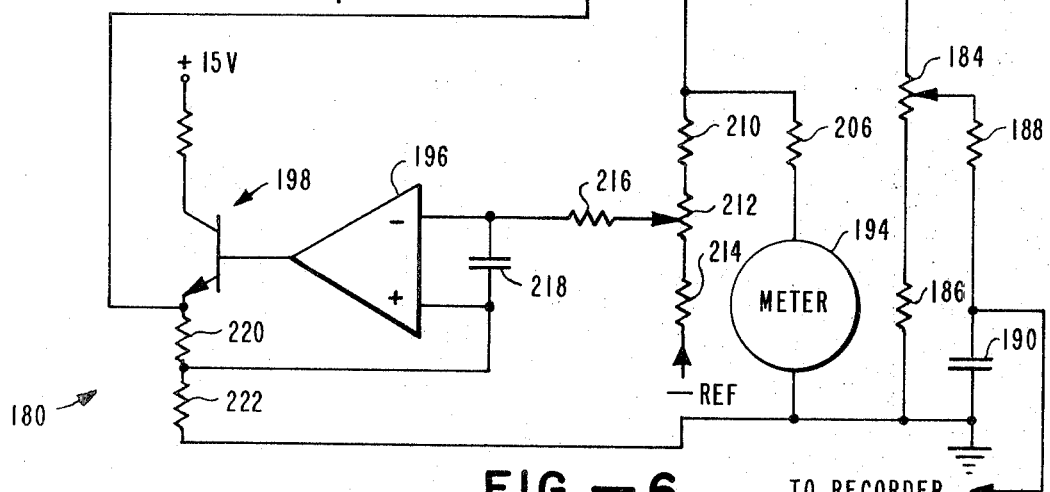
FIG.—6

APPARATUS FOR MONITORING WATER PURIFICATION SYSTEM

BACKGROUND OF THE INVENTION

1. Field of the Invention

This invention relates generally to electrical measuring apparatus and particularly to apparatus for continuously and accurately monitoring the effectiveness of reverse osmosis water purification systems, or the like, by measuring the electrical conductivities of the impure aqueous solution on one side and the relatively pure water on the other side of the semipermeable membrane of the purification system, comparing these measurements and providing an indication of the comparison.

2. History of the Prior Art

In a reverse osmosis water purification system impure aqueous solution is pumped under high pressure into the inlet side of a two part container divided by a semipermeable membrane through which water passes to the low pressure, outlet side of the container.

Reverse osmosis systems have limited and unpredictable life spans. Over a period of time, they may become less effective due to the formation of precipitates, scale or particulate matter on the inlet side of the membrane. If this condition is not promptly detected and corrected by inlet washing, reverse flushing, inlet acid washing or other means, permanent damage may result requiring replacement of the relatively expensive reverse osmosis membrane.

Electrical conductivity of water increases with both impurity concentration and temperature and is conventionally used an in indicator of water purity. For instance, pure water has a very low conductivity, ordinary tap water has a conductivity two or three orders of magnitude greater and sea water has a conductivity about two orders of magnitude greater than ordinary tap water. The temperature dependence of the conductivity of water is both pronounced and rather unpredictable because of a substantial dependence on the type of impurities present. As a result, conventional impurity detection apparatus utilizing conductivity as the measure of impurity levels typically require extensive and complex temperature compensation.

The operating efficiency of reverse osmosis water purificaion systems is generally monitored by periodically and independently measuring the conductivity on each side of the membrane. Calculations are then made involving the measurements and one or more temperature factors to determine the impurity concentrations on each side of the membrane. Although instruments are available which provide automatic temperature correction, they are relatively expensive and complex. For instance, one company offers over 700 different systems for temperature compensation. Thus, this monitoring technique has the disadvantages of being time consuming, inaccurate and discontinuous. In the event of a system malfunction shortly before or after a monitoring operation, permanent damage may be done before a subsequent monitoring operation detects the malfunction.

SUMMARY OF THE INVENTION

In accordance with the broader aspects of the invention, there is provided an apparatus for monitoring the effectiveness of a fluid separation system, an important example of which is a reverse osmosis water purification system. Such a system typically includes an inlet chamber for receiving a solution, an outlet chamber and a membrane separating the inlet and outlet chambers for passing a component part of the solution from the inlet chamber to the outlet chamber. Means operatively associated with the inlet side senses the electrical conductivity of the solution; similar means associated with the outlet side senses the electrical conductivity of the component part. The conductivity sensing means are powered by an electrical source and develop outputs that are compared. An indication of the comparison is also provided.

Although various types of comparisons of the conductivity measurements may be employed, the most meaningful and useful for purposes of monitoring the performance of a purification system is the ratio of the outlet side conductivity to the inlet side conductivity. Thus, in accordance with another aspect of the invention, an electrical circuit is provided whose output is proportional to the ratio of the sensed conductivities. This output may be connected to a meter, a recorder and/or alarm device. The latter, which also comprises a feature of the invention, signals when the effectiveness of the system drops below an adjustable, selected level. The meter may be calibrated to provide a direct visual reading of percent ion passage through the semipermeable membrane as well as the reverse, that is percent ion rejection, on a separate scale.

In accordance with a specific embodiment of the invention, the conductivity sensing means on the inlet side is connected in the negative feedback path of an operational amplifier circuit with high loop gain while the conductivity sensing means on the outlet side is connected in the input of the amplifier circuit. The amplifier circuit may be supplied by either an AC or a DC signal source. The output voltage of the amplifier is proportional to the ratio of the outlet water conductivity to the inlet solution conductivity, which ratio, in turn, is a continuous measure of the relative impurity levels.

In an alternative, specific embodiment of the invention, an AC current generator is coupled to pass a closely controlled AC current through a conductivity cell on the inlet side of the reverse osmosis system. The current has a frequency that is a subharmonic of power line frequency. The inlet side cell is driven by the same signal source as an outlet side cell so that the same voltage (which varies with the resistance of the first cell) is applied to both conductivity cells. Means responsive to the current through the output side cell provides an output signal proportional to the ratio of the currents through the respective cells which in turn is directly proportional to the ratio of the conductivities.

A further aspect of the invention relates to a failsafe circuit for activating an alarm. The voltage representing the conductivity ratio is coupled to provide an input signal to a limit comparator circuit whose output inhibits the operation of an alarm ao long as the input signal remains above a predetermined level. Should the input signal decrease below said level, whether due to a decrease in the performance of the reverse osmosis system or due to a circuit malfunction, the alarm inhibit signal is terminated thereby triggering the alarm.

BRIEF DESCRIPTION OF THE DRAWINGS

A more complete understanding of the invention may be had from a consideration of the following detailed description. taken in conjunction with the accompanying drawings, in which:

FIG. 1 is a generally schematic diagram of a first embodiment of the invention;

FIG. 2 is a generally schematic diagram of a second embodiment of the invention;

FIG. 3 is a generally schematic diagram of a third embodiment of the invention; and, FIGS. 4, 5 and 6 are schematic circuit diagrams of portions of the embodiment of FIG. 3.

DETAILED DESCRIPTION OF THE INVENTION

It should be noted at the outset that although the descriptive matter that follows emphasizes the use of the apparatus of the invention in conjunction with the monitoring of reverse osmosis water purification systems, it will be obvious to those skilled in the art that the apparatus has equal applicability to the monitoring of the performance of virtually any membrane fluid separation, desalting or demineralizing system including electrodialysis systems.

Turning now to FIG. 1 of the drawings showing a first embodiment of the invention, a continuous reverse osmosis water purification system 10, depicted in generalized form, includes an inlet chamber or side 12, an outlet chamber or side 14 and a semipermeable membrane 16 separating the inlet and outlet sides. Impure aqueous solution 18 is continuously introduced into the inlet side through an inlet pipe 20 and brine which accumulates as a result of the purification process is withdrawn from the inlet side via a small discharge orifice 22. As is well known in connection with water purification systems of this type, the solution 18 in the inlet side 12 is maintained at a relatively high pressure (e.g., 300 psi) in comparison with the pressure of the contents of the outlet side (e.g., 50 psi) with the result that water from the impure solution passes through the membrane 16 into the outlet side 14, the dissolved substances being left behind. Thus, relatively pure water 24 is continuously collected in the outlet side 14 and this water is discharged through an outlet pipe 26.

Immersed in the solution 18 and water 24 are electrical resistivity or conductivity measuring means 28 and 30, respectively, which may preferably take the form of commercially available conductivity sensors or cells. Such cells include a pair of spaced electrodes between which the fluid of interest passes. Cell 28 is connected in the feedback path between the output 32 and negative input terminal 34 of an operational amplifier 36 and cell 30 is connected to the input 34 in series with a DC supply 38. The series combination of a current sensing resistor 40 and DC milliammeter 42 across the output of the amplifier 36 provide an indication proportional to the voltage appearing at the output. According to wellknown principles, the output voltage of the operational amplifier 36, assuming a high loop gain and a constant input voltage, is proportional to the ratio of the input resistance to the feedback resistance. Applying Ohm's law, this ratio, in turn, is proportional to the ratio of the conductivities sensed by cells 28 and 30. By appropriate scale markings on the face of meter 42, the meter will read percent ion passage through the membrane 16. A reverse scale can also be provided so that the meter 42 will simultaneously read percent ion rejection. In any case, the meter reading provides a continuous indication of the effectiveness or performance of the system 10. Further in this connection, the output 32 may be connected to a recorder (not shown) and/or an alarm system (an example of which will be discussed below) for signaling when the system's effectiveness in rejecting impurities drops to some selected, minimal level. For instance, a system may be considered to be working properly if the impurity concentration on the outlet side is less than 20 percent of the impurity concentration on the inlet side and an alarm might be sounded if this ratio rises above a selected magnitude, say 22 percent.

The apparatus furthermore minimizes complexity by taking advantage of the substantial temperature equilibrium of fluids on opposite sides of the membrane and by indicating only the ratio of conductivities to obviate the need for temperature correction. Since nearly the same type of fluid appears on both sides of the membrane, temperature affects the conductivities of the two fluids in the same relative proportions.

As will be evident to those skilled in the art, by substituting a constant amplitude sinusoidal, square wave, or other AC source for the DC source 38 and an AC milliammeter (or a rectifier and DC voltmeter) for the milliammeter 42, an equivalent AC system may be provided. An AC system has the advantage of extending the useful life of the conductivity cells by reducing plating on, or erosion of, the cell electrodes. AC amplifiers, of course, do not require elaborate stabilization means or closely matched or trimmed components as do DC amplifiers.

FIG. 2 shows a reverse osmosis system 50 similar to that of FIG. 1 together with conductivity cells 52 and 54 for measuring the conductivity of the contents of the inlet side 56 and the outlet side 58, respectively. The conductivity cells 52 and 54 are connected in an AC phase sensitive measuring and comparison circuit basically similar to that of FIG. 1 and including square wave generator 60 and AC operational amplifier 62. The square wave supplied by generator 60 is a subharmonic of utility power line frequency, for example, 30 Hz. Interference from nearby 60 Hz power sources is minimized since such interference tends to be time averaged to zero. A phase sensitive detector 64, referenced to the 30 Hz generator 60 through line 66 and connected across the output of amplifier 62, provides a DC output signal applied to DC indicating means including milliammeter 68. Thus, the detector 64 functions part time as an inverter, inverting one-half of the cycle so as to produce a DC output. One form of such a detector will be described in connection with the embodiment of FIGS. 3–6. Again, the meter 68 may be scaled to provide continuous, direct readings of percent ion passage and percent ion rejection. Further, coupling capacitors 70 may be incorporated in the circuit as shown if necessary to provide further DC blocking.

Turning now to FIGS. 3–6, there is shown a reverse osmosis system 80 as already described in connection with previous embodiments together with an associated conductivity measuring and comparison apparatus including an inlet side conductivity cell 82 and an outlet side conductivity cell 84. A waveform generator 86 is connected to supply a square wave signal to conductivity cells 82 and 84. The waveform generator 86 includes a divide-by-two multivibrator 88 which receives a standard 60 Hz AC utility power signal, divides its frequency by two, and outputs a 30 Hz square wave signal to a multiplier circuit 90. The divide-by-two multivibrator 88 also provides a 30 Hz square wave GATE signal in phase with the signal provided the multiplier circuit 90 and a complementary $\overline{\text{GATE}}$ signal. The 30 Hz square wave signal received by multiplier circuit 90 is at a saturating voltage and is therefore treated as a constant amplitude signal by circuit 90 notwithstanding any variations in amplitude which might appear thereon. Multiplier circuit 90 multiplies this constant amplitude signal by a DC feedback signal and the resulting output signal is applied through an amplifier 92 to the cells 82 and 84.

A current-to-voltage converting amplifier 94 is connected to the inlet side conductivity cell 82 and generates a voltage output signal indicative of current passing through cell 82. A phase detector 96 responds to the 30 Hz voltage output signal from the current-to-voltage converting amplifier 94 and the GATE signal from multivibrator 88 to generate a DC voltage signal 98 indicative of the magnitude of AC current passing through the cell 82. A high gain comparator 100 compares the DC voltage signal 98 to a negative DC voltage reference signal (−REF) and provides as an output a high gain error signal 102 which is connected to the multiplying input of multiplier circuit 90 to complete a feedback path through conductivity cell 82. This feedback path operates to cause a constant magnitude of current commanded by the negative DC reference input to high gain comparator 100 to pass through cell 82 irrespective of the impurity related conductivity sensed by the cell. The AC voltage across cell 82 is therefore inversely proportional to the conductance of cell 82.

The outlet side conductivity cell 84 is connected to a current-to-voltage converting amplifier 106 which drives a phase detector 108 with a 30 Hz AC voltage proportional to the impurity related conductance exhibited by cell 84. Since cell 84 is driven by the same signal as cell 82, which signal is inversely proportional to the conductivity of the inlet side solution, the voltage across cell 84 is also inversely proportional to the inlet side conductivity. Phase detector 108 is gated by the $\overline{\text{GATE}}$ signal, causing it to drive an inverting output amplifier 110 with a negative DC voltage signal 112 proportional to current passing through the cell 84. Inverting output amplifier 110 receives the negative DC voltage signal 112 to provide a positive DC output signal $V_{OUT}$ which is proportional to the ratio of impurity concentrations on the outlet and inlet sides of the systems 80.

The current-to-voltage converting amplifier 94 is shown in greater detail in FIG. 4 as an operational amplifier 120 with a negative input coupled to cell 82. (In each of FIGS. 4–6, conventional power and compensation circuitry for operational amplifiers have been omitted for clarity.) A pair of oppositely poled diodes 126 and 128 are connected in parallel between the negative input and ground to limit large voltage swings at the input under start-up or transient conditions to prevent saturation of amplifier 120. A gain control feedback path includes a resistor 132 between the negative input and the output of operational amplifier 120.

The current-to-voltage converting amplifier 106 is similar to amplifier 94 except that it includes additional, selected gain control components. Thus, amplifier 106 has a second gain control feedback network including a resistor 136 and a resistor 138 connected in series between the first terminal of a push button switch 140 and the operational amplifier output. A second terminal of switch 140 is connected to the negative input of the operational amplifier and a resistor 142 and a potentiometer 144 are connected in parallel with resistor 138.

The gain control components of amplifiers 94 and 106 are chosen so that when switch 140 is opened the gain of amplifier 106 is exactly twice the gain of amplifier 94. However, when switch 140 is depressed the second gain control feedback network is activated causing the gains of amplifiers 94 and 106 to be equal.

This variable gain arrangement permits ready calibration of an output meter indicating the ratio of concentrations on either side of the semipermeable membrane. For instance, with both cells 82 and 84 immersed in the same solution, the button 140 is depressed and the output meter is calibrated to a full scale reading which represents a one-to-one concentration ratio. Then the button 140 is released and the cells 82 and 84 are arranged as shown in FIG. 3. Now, with the amplifier 106 having twice the gain of amplifier 94, the output meter will show a full scale reading when the impurity concentration on the outlet side is half the impurity concentration on the inlet side. This 1:2 full scale meter ratio permits greater sensitivity within the maximum safe ratio for proper operation of the reverse osmosis system 80.

For purposes of illustration, particular circuit element values that can be employed in the circuit of FIG. 4 are as follows:

| Element | Value |
| --- | --- |
| 132 | 150K ohms (for amplifier 94) |
| 132 | 300K ohms (for amplifier 106) |
| 136 | 250K ohms |
| 138 | 510K ohms |
| 142 | 33K ohms |
| 144 | 50K ohms |

Amplifier 120 may be a National Semiconductor LM 301 AH, or equivalent, and diodes 126 and 128 may each be an ITT 600, or equivalent.

The phase detector 96 and comparator 100 are shown in greater detail in FIG. 5. The phase detector 96 includes an operational amplifier 150 having a positive input connected to ground and a negative input connected both through a capacitor 152 and a resistor 154 to ground and to a gain control circuit. The gain control circuit includes resistor 156, a resistor 158, a potentiometer 160, and a resistor 162 sequentially connected in series between the output (labeled $e_1$) from the current-to-voltage converting amplifier 94 and the output 98 of the phase detector 96. The movable tap of potentiometer 160 is connected to a negative input of amplifier 150 and a capacitor 164 is connected between the negative input and the output of amplifier 150.

The comparator 100 includes an operational amplifier 170 having a capacitor 172 connected between the output 102 and the negative input. The negative input is also connected through a resistor 174 to the output 98 of phase detector 96 and through a resistor 176 to a reference voltage of approximately −7.5V. Resistor T, selected to compensate for variations in the reference voltage, is connected in parallel with resistor 176 and the positive input to amplifier 170 is connected to ground.

By way of example, the following specific circuit element values may be employed in the phase detector 96 and comparator 100:

| Element | Value |
|---|---|
| 152 | .001 µf |
| 154 | 100 ohms |
| 156 | 33K ohms |
| 158 | 33K ohms |
| 160 | 5K ohms |
| 162 | 33K ohms |
| 164 | .001 µf |
| 172 | .001 µf |
| 174 | 100K ohms |
| 176 | 270K ohms |

Amplifiers 150 and 170 may be portions of an RCA CA 3060 E amplifier, or the equivalent.

During a negative half cycle of current generated by amplifier 92 (FIG. 3) this current is converted to a positive voltage $e_1$ by amplifier 94 and amplifier 150 (FIG. 5) is gated off. Because the sum of resistors 156, 158, 160, 162 and 174 is approximately 200K ohms, a current of $e_1/200K$ is caused to flow through resistor 174 to the negative input of amplifier 170. However, the output 102 from comparator 100 will be driven positive by current drawn by —REF until the magnitude of $e_1$ causes the current $e_1/200K$ to be exactly equal the current drawn by —REF. During a positive half cycle of cell current the input to phase detector 96 is $-e_1$ and the amplifier 150 is gated on. Amplifier 150 has a gain of approximately —one-half, making the output voltage $(-e_1)$ (—one-half) and the current through resistor 174 equal to $e_1/(2)(100K)$ or substantially the same as during the negative half cycle of cell current. Balance control potentiometer 160 permits the gain of amplifier 150 to be calibrated so that the current through resistor 174 will be the same for both half cycles of current through the cell. This insures that there will be no DC component of current through the cells.

60 Hz noise from the utility power source is minimized at the output 98 because the synchronized 30 Hz GATE signal causes the 60 Hz utility power supply to go through a complete cycle during each half cycle of phase detector operation. This causes any 60 cycle interference to be substantially time averaged to zero.

The phase detector 108 is identical to phase detector 96 except that it is gated by the GATE signal and therefore provides a negative DC output signal 112 rather than a positive DC output such as signal 98.

The output amplifier 110, details of which are not shown, is of conventional design and has an arrangement generally like that of comparator 100. Instead of capacitor 172, however, a feedback resistance is employed. A resistance, like resistance 174, is connected to the input and by appropriate selection of resistance values (e.g., 220K ohms for the feedback resistance and 100K for the input resistance), the overall gain of detector 108 and amplifier 110 is approximately 1.35.

As shown in FIG. 6, an alarm indicator circuit 180 has an input terminal 182 connected to receive the $V_{OUT}$ signal from amplifier 110 and includes a recorder circuit and an alarm and meter circuit. The recorder circuit includes a potentiometer 184 and a resistor 186 connected between terminal 182 and ground, and a resistor 188 and a filter capacitor 190 connected in series between the movable contact of potentiometer 184 and ground. The output to a conventional recorder (now shown) is taken between resistor 188 and capacitor 190. Potentiometer 184 permits calibration adjustment of the output to the recorder.

The alarm and meter circuit includes a switch 192, a milliammeter 194, and an operational amplifier 196. An emitter follower circuit 198 is connected to the output of operational amplifier 196. Switch 192 has one terminal connected to an emitter output of emitter follower circuit 198 and the other terminal connected to terminal 182. A test switch 200, ganged to the switch 192, is connected between the emitter output of emitter follower circuit 198 and an alarm override circuit 202. A fail-safe alarm output signal is a positive voltage signal which inhibits the operation of an alaram as long as the voltage is present. The alarm is thus automatically set off if a trigger point is reached or if a circuit malfunction causes the alarm inhibit signal to be terminated. A switch 204 within the alarm override circuit 202 connects the alarm output to a DC source (for example, +15V) notwithstanding the reaching of an alarm trigger point or the opening of test switch 200 which normally permits a testing of the alarm by the opening thereof when switch 204 is opened.

The meter 194 is connected in series with a resistor 206 between the movable contact arm of switch 192 and ground. The meter 194 preferably has a null position toward the right at zero current and the needle goes counterclockwise to the left at maximum current. By way of illustration, the meter 194 may have a first scale behind the needle to read percent ion passage and extending from 0 to 50 percent reading from right to left. A second scale behind the same needle may be included and marked to read percent ion rejection with graduations from 50 to 100 percent reading left to right. Scaled in this fashion, at the extreme right hand zero position of the needle the meter would indicate 0 percent passage and 100 percent rejection. At midscale, the needle would indicate 25 percent passage and 75 percent rejection.

The alarm trigger circuit includes a resistor 210, a potentiometer 212, and a resistor 214 connected in series between the movable contact arm of switch 192 and a negative DC reference potential. The movable contact of potentiometer 212 is connected through a resistor 216 to the negative input of amplifier 196 and a capacitor 218 is connected between the negative and positive inputs of amplifier 196 to filter out any AC signal. Potentiometer 212 is adjusted to set the trigger level or magnitude of the output required to provide a positive current to the negative input of amplifier 196. To insure decisive switching of the amplifier 196 at the trigger voltage level the positive output is regeneratively coupled between a relatively large resistor 220 connected to the emitter output of emitter follower circuit 198 and a resistor 222 connected to ground.

By way of illustration, the following circuit element values may be utilized in the alarm indicator circuit 180:

| Element | Value |
|---|---|
| 184 | 50K ohms |
| 186 | 3.3K ohms |
| 188 | 10K ohms |
| 190 | 10 µf |
| 206 | 11K ohms |
| 210 | 1K ohms |

-Continued

| Element | Value |
| --- | --- |
| 212 | 50K ohms |
| 214 | 27K ohms |
| 216 | 2.2K ohms |
| 218 | 0.1 µf |
| 220 | 1 megohm |
| 222 | 22K ohms |

Amplifier 196 may be a portion of an RCA CA 3060 E amplifier, or the equivalent.

Under normal operating conditions switch 200 is closed and switch 192 has its movable contact arm positioned to receive $V_{OUT}$. With $V_{OUT}$ below the trigger level amplifier 196 is driven by the negative DC reference signal to provide a positive output signal to emitter follower circuit 198 which in turn drives the alarm output signal through switch 200. As the ratio of outlet side conductivity to inlet side conductivity increases (signifying the deteriorating performance of the reverse osmosis system), the DC voltage $V_{OUT}$ increases until the voltage at the movable contact of potentiometer 212 exceeds the voltage at the positive input to amplifier 196. This is the trigger point at which amplifier 196 regeneratively switches, causing the output of emitter follower circuit 198 to go to ground and thereby terminating the alarm inhibit signal.

In order to adjust the trigger point to a desired level the movable contact arm of switch 192 is repositioned to its second position to provide a negative feedback path to the emitter output of emitter follower 198. In this position the output is automatically driven to the trigger point voltage and the trigger point ratio can be read directly from meter 194 as potentiometer 212 is adjusted to a desired trigger point position. With the trigger point adjusted, the movable contact arm of switch 192 is returned to the position where it receives the $V_{OUT}$ signal and normal operation of the alarm circuit 180 is continued.

Although there have been described above specific arrangements of apparatus for monitoring reverse osmosis water purification systems or the systems in accordance with the invention, it will be appreciated that the invention is not limited thereto. Thus, although the apparatus of the invention preferably utilizes a pair of conductivity cells, it will be appreciated that one cell, time shared by the inlet and outlet sides by physically moving the cell or by valving samples of the inlet and outlet side contents through the cell, may be satisfactorily employed. Moreover, the invention contemplates not only the use of conductivity measuring means forming elements separate and distinct from the structure of the reverse osmosis system, but also conductivity measuring means using the structure of the system (such as the walls of the inlet and outlet side or the pipe carrying the solution) as an element of the measuring means.

Accordingly, all modifications, variations, and equivalent arrangements within the scope of the appended claims should be considered to be within the scope of the invention.

What is claimed is:

1. Apparatus for monitoring the effectiveness of a fluid separation system, said system comprising separation apparatus including means defining an inlet chamber for receiving a solution, means defining an outlet chamber, and means for defining a membrane separating said inlet and outlet chambers for passing a component part of said solution from said inlet chamber to said outlet chamber, said monitoring apparatus including:

first means operatively associated with said inlet chamber for providing a conductivity signal representative of the conductivity of said solution;

second means operatively associated with said outlet chamber for providing a conductivity signal representative of the conductivity of said component part of said solution;

means connected to said first and second means for applying an input signal to said first and second means; and means responsive to said inlet and outlet chamber conductivity signals for comparing said signals and continuously providing a signal which indicates the relative impurity concentrations of the fluids on opposite sides of said membrane-defining means.

2. Monitoring apparatus, as defined in claim 1, in which:

said comparing and indicating means includes circuit means having an output signal proportional to the ratio of the impurity concentration of said component part of said solution to the impurity concentration of said solution.

3. Apparatus for monitoring the effectiveness of a fluid separation system, said system comprising separation apparatus including means defining an inlet chamber for receiving a solution, means defining an outlet chamber, and means for defining a membrane separating said inlet and outlet chambers for passing a component part of said solution from said inlet chamber to said outlet chamber, said monitoring apparatus including:

first means operatively associated with said inlet chamber for providing a conductivity signal representative of the conductivity of said solution;

second means operatively associated with said outlet chamber for providing a conductivity signal representative of the conductivity of said component part of said solution;

means connected to said first and second means for applying an input signal to said first and second means; and circuit means including a high loop gain amplifier having an input and an output and a negative feedback path connecting said input and said output, said second means being connected to said input of said amplifier and said first means being connected to said feedback path, a circuit means output signal proportional to the ratio of the impurity concentration of said component part of said solution to the impurity concentration of said solution being provided at the amplifier output.

4. Monitoring apparatus, as defined in claim 3, in which:

said circuit means is energized by a direct current source.

5. Monitoring apparatus, as defined in claim 3, in which:

said circuit means is energized by an alternating current source.

6. Monitoring apparatus, as defined in claim 5, in which:

said output of said amplifier is coupled to a phase sensitive detector referenced to a signal generated by said alternating current source, said phase sensitive detector inverting alternate half cycles of said source, said circuit output signal comprising a direct current signal developed by said phase sensitive detector.

7. Monitoring apparatus, as defined in claim 2, in which:
said means for applying an input signal includes means for controlling the current level through said first means and maintaining said current level substantially constant, the voltage applied to said first means varying substantially solely as a function of the electrical resistance exhibited by said first means and means connected to said second means for applying said voltage to said second means, said comparing and indicating means being connected to sense and measure the current through said second means, said current being proportional to said ratio.

8. Apparatus for monitoring the effectiveness of a reverse osmosis water purification system, or the like, said system comprising purification apparatus including an inlet chamber for receiving an impure aqueous solution, an outlet chamber and a semipermeable membrane separating said inlet and outlet chambers for passing relatively pure water from said inlet chamber to said outlet chamber, said monitoring apparatus including:
a first conductivity cell in said inlet chamber for sensing the conductivity of said solution;
a second conductivity cell in said outlet chamber for sensing the conductivity of said water; and
an electrical circuit coupled to said conductivity cells for applying a single input signal to said cells, the electrical circuit having an output indicative of the ratio of the impurity concentration of the water to the impurity concentration of the solution and providing a warning when the ratio is beyond a selected level.

9. Apparatus for monitoring the effectiveness of a reverse osmosis water purification system, or the like, said system comprising purification apparatus including an inlet chamber for receiving an impure aqueous solution, an outlet chamber and a semipermeable membrane separating said inlet and outlet chambers for passing relatively pure water from said inlet chamber to said outlet chamber, said monitoring apparatus including:
a first conductivity cell in said inlet chamber for sensing the conductivity of said solution;
a second conductivity cell in said outlet chamber for sensing the conductivity of said water; and
an electrical circuit coupled to said conductivity cells for applying an input signal to said cells, said circuit including a high loop gain amplifier having an input, an output terminal and a feedback path coupling said output terminal and said input, said first conductivity cell being connected in said feedback path and said second conductivity cell being connected to said amplifier input, a circuit output indicative of the ratio of the impurity concentration of the water to the impurity concentration of the solution appearing at said output terminal.

10. Apparatus for monitoring the effectiveness of a reverse osmosis water purification system, or the like, said system comprising purification apparatus including an inlet chamber for receiving an impure aqueous solution, an outlet chamber and a semipermeable membrane separating said inlet and outlet chambers for passing relatively pure water from said inlet chamber to said outlet chamber, said monitoring apparatus including:
a first conductivity cell in said inlet chamber for sensing the conductivity of said solution;
a second conductivity cell in said outlet chamber for sensing the conductivity of said water; and
an electrical circuit coupled to said conductivity cells for applying an input signal to said cells, said circuit including an AC current generator connected to pass a selected, closely regulated AC current through said first conductivity cell, an electrical potential developed by said generator being applied to both said conductivity cells and means for sensing and indicating the magnitude of current through said second cell, the sensing and indicating means and said second cell being connected in series, the current magnitude indication being indicative of the ratio of the impurity concentration of the water to the impurity concentration of the solution.

11. A monitoring apparatus, as defined in claim 10, in which:
said AC current generator comprises an AC square wave generator operating at a line frequency of one half the frequency of a source of AC power for the circuit and operating at a magnitude dependent upon a control signal and a high gain feedback loop including a current-to-voltage converting amplifier responsive to the AC current through said first conductivity cell, a phase detector having a balance control permitting the adjustment of DC bias in the input signal thereto responsive to the converting amplifier and a gating signal at the frequency of the current through said first cell, and a high gain comparator connected to provide a control signal to the square wave generator in response to inputs from a reference source and the phase detector.

12. A monitoring apparatus, as defined in claim 11, in which:
said sensing and indicating means comprises a second current-to-voltage converting amplifier responsive to current through said second cell and a second phase detector responsive to the second converting amplifier and a gating signal at the frequency of the current through said first cell.

13. A monitoring apparatus, as defined in claim 12, in which:
said sensing and indicating means further comprises a meter responsive to the second phase detector and a gain control having a first position wherein the meter provides a full scale reading when the conductivity sensed by said first cell equals the conductivity sensed by said second cell and a second position wherein the meter provides a full scale reading when the conductivity sensed by said second cell is a selected fraction of the conductivity sensed by said first cell.

14. A monitoring apparatus, as defined in claim 13, in which:
said sensing and indicating means further comprises a limit comparator circuit having an amplifier with an adjustable input responsive to a reference signal and a signal at a limit comparator input terminal and an output providing a failsafe alarm inhibit signal, the adjustment of the input determining the magnitude of the signal at the limit comparator input terminal for which the limit comparator amplifier ceases to provide the alarm inhibit signal, and switching means having a normal operating position wherein the meter and limit comparator input terminal are connected to the second phase detector and a test position wherein the meter and limit comparator input terminal are connected to the output of the limit comparator amplifier.

15. In a water purification system, the combination comprising:

water purification apparatus including means defining an inlet chamber for receiving an impure aqueous solution, means defining an outlet chamber, and a semipermeable membrane separating said inlet and outlet chambers for passing water from said solution in said inlet chamber to said outlet chamber; and means coupled to said purification apparatus for monitoring the effectiveness of the purification process including:

first means operatively associated with said inlet chamber for providing a conductance proportional to the impurity related conductivity of said solution;

second means operatively associated with said outlet chamber for providing a conductance proportional to the impurity related conductivity of said water; and circuit means for applying a single input signal to said first and second means, said circuit means further being responsive to the outputs of said first and second means, making a comparison between said outputs and indicating the relative impurity concentrations of said solution and water.

16. The combination, as defined in claim 15, in which:

said circuit means has an output signal proportional to the ratio of the impurity concentrations on opposite sides of said membrane.

17. Monitoring apparatus, as defined in claim 16, in which:

said circuit means includes means for controlling the current level through one of said first and second means and maintaining said current level substantially constant, the voltage applied to said one of said first and second means varying substantially solely as a function of the resistance exhibited by said one of said first and second means, means connected to said other of said first and second means for applying said voltage to said other of said first and second means, and means connected to said other of said first and second means for sensing and measuring the current through said other of said first and second means, said current being proportional to said ratio.

18. Monitoring apparatus, as defined in claim 16, in which:

said circuit means includes a high loop gain amplifier having an input and an output and a negative feedback path connecting said input and said output, one of said first and second means being connected to said input of said amplifier and the other of said first and second means being connected in said feedback path, said output signal being derived at said amplifier output.

19. Monitoring apparatus, as defined in claim 18, in which:

said circuit means is powered by a direct current source.

20. Monitoring apparatus, as defined in claim 18, in which:

said circuit means is powered by an alternative current source.

21. Monitoring apparatus, as defined in claim 20, in which:

said output of said amplifier is coupled to a phase sensitive detector referenced to a signal generated by said alternating current source, said phase sensitive detector inverting alternate half cycles of said source, said circuit output signal comprising a direct current signal developed by said phase sensitive detector.

22. In a reverse osmosis water purification system having a reverse osmosis membrane with an inlet chamber on one side of the membrane for holding impure aqueous solution under relatively high pressure and an outlet chamber disposed on the other side of said membrane for holding, at a relatively low pressure, relatively pure water having passed through said membrane, a conductivity ratio monitor comprising an electric circuit continuously responsive to the conductivity of the solution in the inlet chamber and the water in the outlet chamber continuously generating a single output indicative of the ratio of the conductivity of said water to the conductivity of said solution.

23. A monitor, as defined in claim 22, in which:

said monitor includes an alarm responsive to said ratio indicative output, said alarm signalling when said ratio reaches a preselected level.

* * * * *

PO-1050
(5/69)

UNITED STATES PATENT OFFICE
CERTIFICATE OF CORRECTION

Patent No. 3,838,774                 Dated   October 1, 1974

Inventor(s) John C. Dolan and Newton E. Ball

It is certified that error appears in the above-identified patent and that said Letters Patent are hereby corrected as shown below:

Column 2, line 50, "output side cell" should read --outlet side cell--. Column 5, line 49, "tems" should read --tem--. Column 7, line 48, after "the" and before "signal", "GATE" should read --GATE--. Column 9, line 42, after "or" and before "systems", "the" should read --like--.

Signed and sealed this 4th day of March 1975.

(SEAL)
Attest:

RUTH C. MASON
Attesting Officer

C. MARSHALL DANN
Commissioner of Patents
and Trademarks